(12) United States Patent
Tougas et al.

(10) Patent No.: US 12,731,123 B1
(45) Date of Patent: Sep. 8, 2026

(54) BIOMETRIC AUTHENTICATION SYSTEM

(71) Applicant: United Services Automobile Association (USAA), San Antonio, TX (US)

(72) Inventors: Brian Tougas, Spring Branch, TX (US); Susan Elizabeth Wright, San Antonio, TX (US); Reynaldo Medina, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 84 days.

(21) Appl. No.: 18/823,066

(22) Filed: Sep. 3, 2024

Related U.S. Application Data

(63) Continuation of application No. 17/713,788, filed on Apr. 5, 2022, now Pat. No. 12,106,279, which is a continuation of application No. 16/599,573, filed on Oct. 11, 2019, now Pat. No. 11,328,280.

(60) Provisional application No. 62/753,798, filed on Oct. 31, 2018.

(51) Int. Cl.
*G06Q 20/20* (2012.01)
*H04L 9/40* (2022.01)

(52) U.S. Cl.
CPC ....... *G06Q 20/206* (2013.01); *H04L 63/0861* (2013.01)

(58) Field of Classification Search
CPC .......................... G06Q 20/206; H04L 63/0861
See application file for complete search history.

(56) References Cited

U.S. PATENT DOCUMENTS

2004/0069846 A1 4/2004 Lambert
2007/0038863 A1 2/2007 Nguyen et al.
2009/0104888 A1 4/2009 Cox
2016/0321441 A1* 11/2016 Tonoyan ................ G06F 21/32

* cited by examiner

*Primary Examiner* — A. Hunter Wilder
(74) *Attorney, Agent, or Firm* — Potomac Law Group, PLLC; Dannon G. Allbee

(57) ABSTRACT

The disclosure describes a biometric authentication system that can authorize a transaction at a retail store using a person's biometric data and password. The biometric authentication system may include a point-of-sale device that can receive a biometric data (e.g., voice data, fingerprint data, or facial data) of a person that initiates a transaction. The biometric authentication system may also include one or more authentication systems that analyzes the received biometric data, and an authorization system that compares data obtained from the one or more authentication systems and the POS device to determine whether the information obtained from the person is related to that person's biometric and password information previously stored by the authorization system.

20 Claims, 7 Drawing Sheets

400

BIOMETRIC AUTHENTICATION SYSTEM

CROSS-REFERENCE TO RELATED APPLICATIONS

This application is a continuation of U.S. patent application Ser. No. 17/713,788, filed on Apr. 5, 2022, entitled “BIOMETRIC AUTHENTICATION SYSTEM,” currently pending which is a continuation of U.S. patent application Ser. No. 16/599,573, filed on Oct. 11, 2019, entitled “BIOMETRIC AUTHENTICATION SYSTEM,” now U.S. Pat. No. 11,328,280 issued on May 10, 2022, which is a non-provisional of and claims priority to U.S. Provisional Patent Application No. 62/753,798, filed on Oct. 31, 2018, entitled “BIOMETRIC AUTHENTICATION SYSTEM,” all of which are hereby incorporated by reference in their entireties for all purposes.

BACKGROUND

Shopping at a physical retail store involves a familiar process. A consumer first obtains one or more items from the retail store, and then the consumer stands in a checkout line to purchase the one or more items. Often, the consumer pays for the one or more items using a physical credit card or a digital credit card stored on the consumer's mobile device. However, such a conventional system requires the consumer to carry either a physical form of payment or a mobile device that includes a digital form of payment. Thus, conventional payment systems at retail stores require consumers to carry some form of physical device or hardware to purchase an item.

Figure 1:
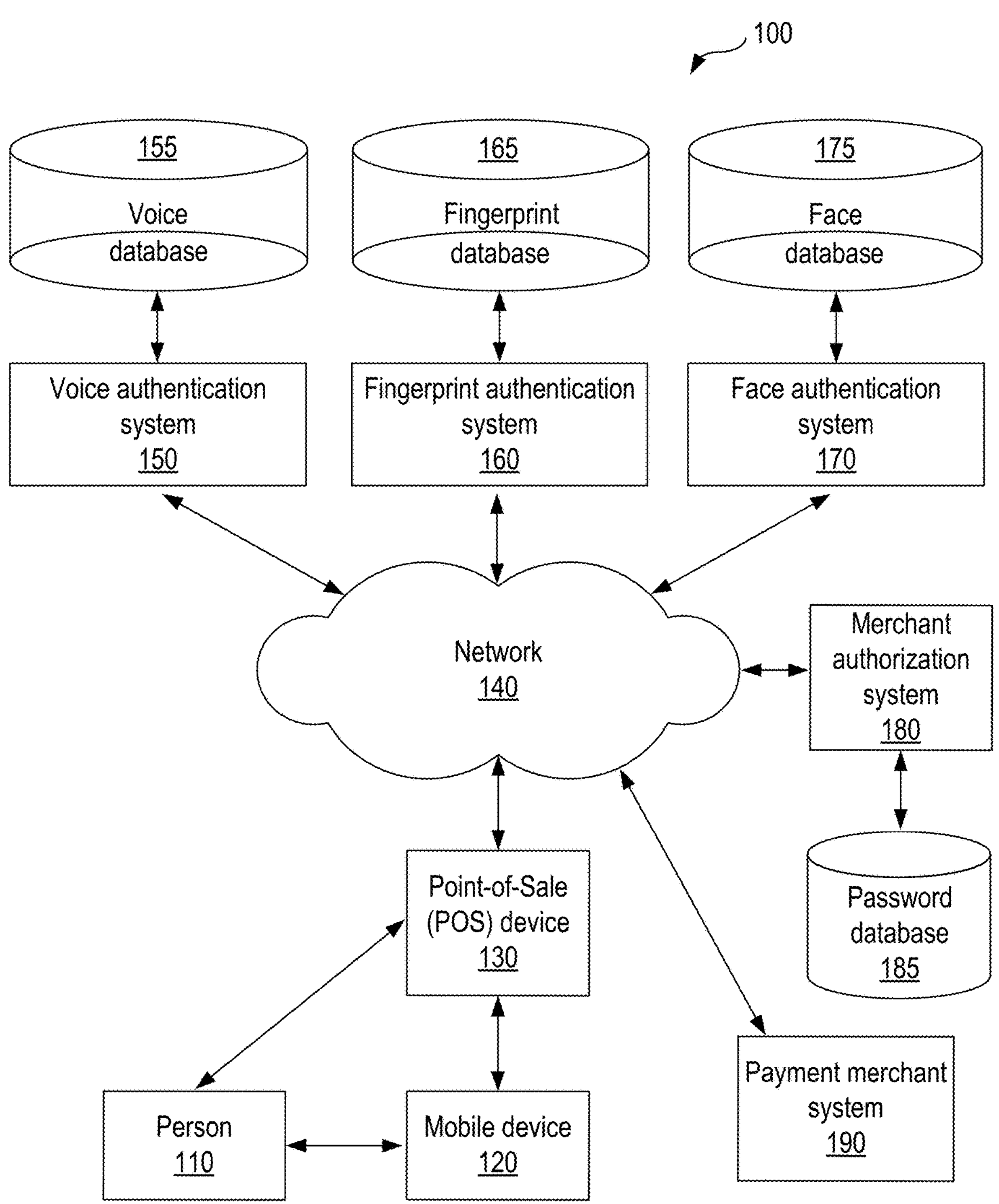
FIG. 1 shows an example of an operating environment for a biometric authentication system.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

Various embodiments of the present disclosure generally relate to using a person's biometric data obtained at a retail store to authorize a transaction initiated by that person at the retail store. Unlike conventional technology, the technology disclosed in the present disclosure minimizes the physical devices or hardware carried by the person at the retail store for performing a transaction. Specifically, various embodiments of the present disclosure relate to (1) a point-of-sale (POS) device for obtaining a set of biometric data and a password from a person; (2) one or more authentication systems for determining whether the set of biometric data matches information associated with previously stored biometric data of the person; and (3) an authorization system for authorizing the transaction by the person if the obtained set of biometric data and password matches information associated with previously stored biometric data and password associated with the person.

FIG. 1 shows an example of an operating environment for a biometric authentication system 100. An overview of the biometric authentication system 100 is first presented below, followed by a detailed presentation of the operations performed by the various systems and devices of the biometric authentication system 100. The biometric authentication system 100 includes at least the following three devices or systems that collect and analyze a person's biometric and personal data to authorize that person for a transaction: (1) a point-of-sale (POS) device 130, (2) one or more authentication systems 150, 160, 170, and (3) an authorization system 180. The POS device 130 can gather certain biometric and personal information (e.g., password) associated with a person who approaches the POS device 130 to initiate a transaction. The one or more authentication systems 150, 160, 170 can determine whether the gathered biometric information is the same as or is related to previously known biometric information about the person 110, and can generate authentication hash values (or other types of values) based on at least some of the biometric data gathered from the person 110. And, the merchant authorization system 180 can compare the generated values with a set of pre-determined values that correspond to biometric data previously known about the person 110.

The POS device 130 can initiate a process of authorizing the person 110 for a transaction by receiving biometric data of the person 110 and a password from the person 110 or from a mobile device 120 associated with the person 110. The POS device can receive a set of biometric data such as voice data of the person 110, fingerprint data of the person 110, and facial data of the person 110 to be sent to one or more authentication systems 150, 160, 170 for analysis (as further described below). The POS device 130 can also receive a password and send the password to a merchant authorization system 180 for analysis (as further described below).

In some embodiments, the POS device 130 can trigger the process of collecting a person's biometric data in response to receiving a password from the person 110 or from a mobile device 120 associated with the person 110. For example, the mobile device 120 may receive the password to be sent to or entered into the POS device. In this example, the password may be sent by the merchant authorization system 180 to the mobile device 120 prior to the POS device 130 receiving the password. A person 110 may look at the password received by the mobile device 120 and physically enter the password into a keyboard associated with the POS device, or the mobile device 120 may wirelessly send the password to the POS device 130. The password may be static or may be periodically changed by the merchant authorization system 180 after a pre-determined length of time. In other embodiments, the mobile device 120 sends a pre-determined type of message other than the password to the POS triggering the collection of biometrics.

Figure 2:
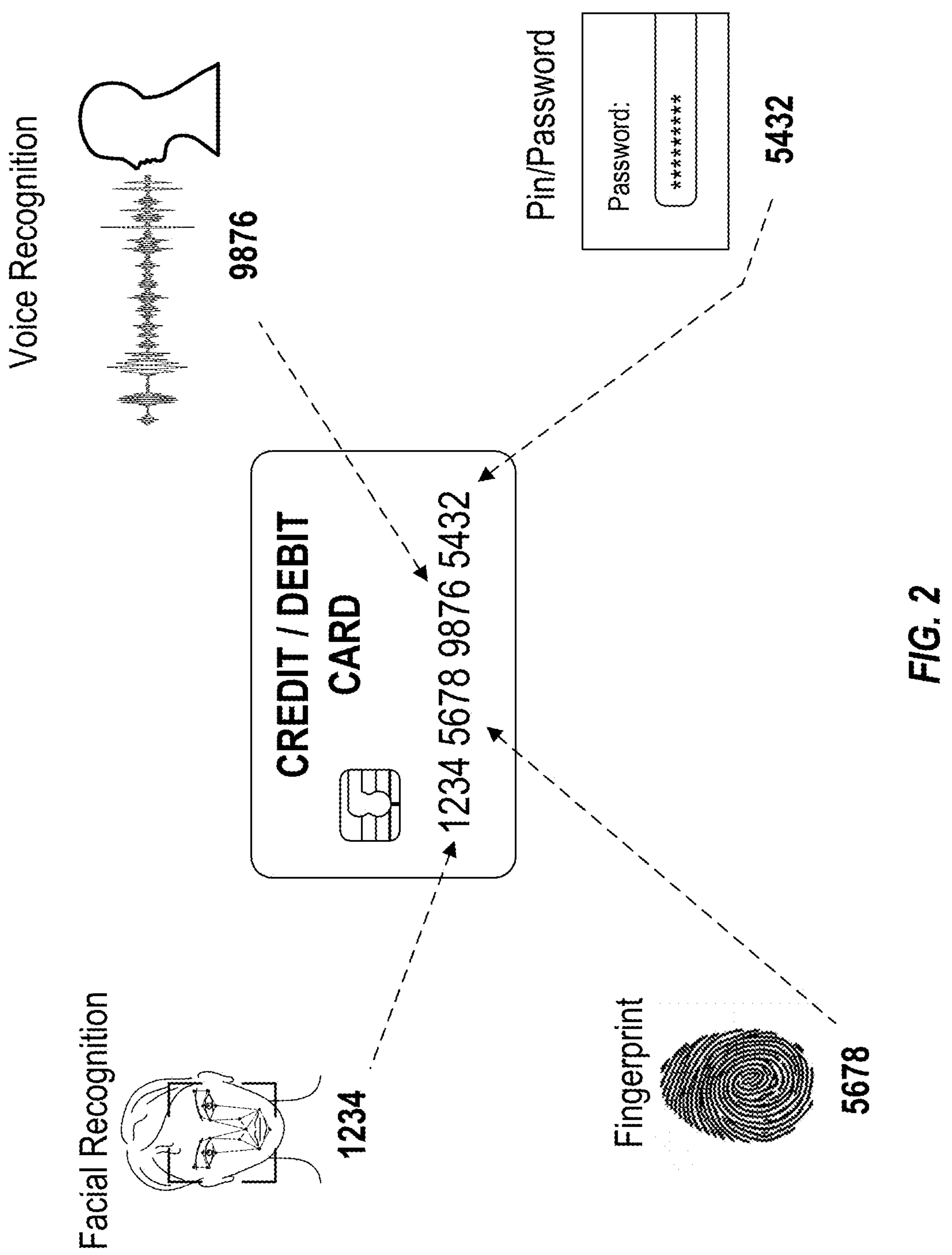
FIG. 2 shows a person's biometric data and personal information being associated with a form of payment.

To minimize the physical devices or hardware carried by the person 110 for a transaction, the biometric data and password provided by a person can be considered to relate to a form of payment (e.g., credit card or debit card) associated with the person 110. For instance, as shown in FIG. 2, a person's credit card or debit card number may include four sets of numbers where each set includes four numbers (e.g., 1234 5678 9876 5432). The first four numbers (i.e., 1234) can relate to a person's facial features, the next four numbers (i.e., 5678) can relate to the person's fingerprint data, the next four numbers (i.e., 9876) relate to the person's voice data, and the last four numbers (i.e., 5432) relate to the person's password. In other embodiments, each form of biometrics and the password are equally connected to the payment card (e.g., correct fingerprint plus correct password are enough to authorize use of the credit card). Business rules can determine an importance of each form of biometrics, and thus determine if fewer biometric information needs to be collected for the transaction. The amount of biometrics required for a purchase can vary by store, person, amount of purchase, time of day, location, or other features or combination of features.

For security purposes, the biometric data obtained by the POS device 130 and analyzed by the one or more authentication systems 150, 160, 170 may not yield a complete credit card or debit card number. For instance, as further explained below, the face authentication system 170 generates a first authentication hash value associated with the facial data obtained from the POS data, and the merchant authorization system 180 compares the first authentication hash value with a previously known second authentication hash value associated with the person's facial data. The first and second authentication hash values may not be the same as a set of numbers of a form of payment (i.e., "1234" in FIG. 2).

In FIG. 1, the POS device 130 sends the voice data of the person 110, the fingerprint data of the person 110, the facial data of the person 110 to a plurality of authentication systems 150, 160, 170 via a network 140 (e.g., the Internet). The voice authentication system 150 is configured to receive and analyze voice data by comparing the received voice data to previously stored voice data located on the voice database 155. The voice authentication system 150 communicates with the voice database 155 that stores previously known voice data of various persons. When the voice authentication system 150 receives voice data from the POS device 130, the voice authentication system 150 compares at least some features of the received voice data (e.g., a set of pitches or a set of frequencies) to features of previously collected voice data stored on the voice database 155.

If the voice authentication system 150 determines that at least some of the features of the received voice data matches at least some of the features of the previously collected voice data, then the voice authentication system 150 combines at least some features of the received voice data (e.g., a set of pitches or a set of frequencies) with a first hash function to produce a first authentication hash value that is based on at least some of the received voice data. In some implementations, the user registers with various authentication systems. The POS device can send some type of identification collected from the user (e.g., name, identification number).

Examples of hash functions include different types of Secure Hash Algorithms (SHA-1, SHA-2, or SHA-3) or a Jenkins hash function. Thus, the voice authentication system 150 generates a first value (e.g., a first authentication hash value) in response to determining that at least some of the received voice data matches information associated with a previously stored voice data of the person. The voice authentication system 150 sends the first value to the merchant authorization system 180 via the network 140 for further analysis to determine whether the first value is associated with the person.

As indicated above, the POS device 130 sends the fingerprint data of the person 110 to a fingerprint authentication system 160. The fingerprint authentication system 160 is configured to receive and analyze fingerprint data by comparing the received fingerprint data to previously stored fingerprint data located on the fingerprint database 165. The fingerprint authentication system 160 communicates with the fingerprint database 165 that stores previously known fingerprint data of various persons. When the fingerprint authentication system 160 receives fingerprint data from the POS device 130, the fingerprint authentication system 160 compares at least some features of the received fingerprint data (e.g., fingerprint data associated with a set of pre-determined locations on the fingerprint) to features of previously collected fingerprint data stored on the fingerprint database 165.

If the fingerprint authentication system 160 determines that at least some of the features of the received fingerprint data matches at least some of the features of the previously collected fingerprint data, then the fingerprint authentication system 160 combines at least some features of the received fingerprint data (e.g., fingerprint data associated with a set of pre-determined locations on the fingerprint) with a second hash function to produce a second authentication hash value that is based on at least some of the received fingerprint data.

Thus, the fingerprint authentication system 160 generates a second value (e.g., a second authentication hash value) in response to determining that at least some of the received fingerprint data matches information associated with a previously stored fingerprint data of the person. The fingerprint authentication system 160 sends the second value to the merchant authorization system 180 via the network 140 for further analysis to determine whether the second value is associated with the person.

The POS device 130 also sends the facial data of the person 110 to a face authentication system 170. The face authentication system 170 is configured to receive and analyze facial data by comparing the received facial data to previously stored facial data located on the face database 175. The face authentication system 170 communicates with the face database 175 that stores previously known face data of various persons. When the face authentication system 170 receives facial data from the POS device 130, the face authentication system 170 compares at least some features of the received facial data (e.g., distance between eyes, or an angle formed by some facial features) to features of previously collected face data stored on the face database 175.

If the face authentication system 170 determines that at least some of the features of the received facial data matches at least some of the features of the previously collected face data, then the face authentication system 170 combines at least some features of the received facial data (e.g., distance between eyes, or an angle formed by some facial features) with a third hash function to produce a third authentication hash value that is based on at least some of the received facial data.

Thus, the face authentication system 170 generates a third value (e.g., a third authentication hash value) in response to determining that at least some of the received facial data matches information associated with a previously stored face data of the person. The face authentication system 170 sends the third value to the merchant authorization system 180 via the network 140 for further analysis to determine whether the third value is associated with the person.

As explained in FIG. 2, the first authentication hash value, the second authentication hash value, the third authentication hash value, and the password may be associated with the person's credit card or debit card number. In some embodiments, the first, second, and third hash functions used by the three authentication systems 150, 160, 170 may be different hash functions. The first hash function, the second hash function, and the third hash function can be periodically changed by the authentication systems 150, 160, 170 after a pre-determined length of time. The first, second, and third hash functions used by the three authentication systems may be the same or related to a set of three hash functions used by the merchant authorization system 180 to obtain the set of pre-determined values that correspond to biometric data previously known about the person (as further described below).

FIG. 1 shows a merchant authorization system 180 that is configured to authorize the person for the transaction based on the person's biometric data and password. The merchant authorization system 180 receives the first value, the second value, the third value from each authentication system, and the merchant authorization system 180 receives the password from the POS device 130 via the network 140. The merchant authorization system 180 can receive identity information from the POS system (e.g., the user types in their name) or one or more of the authentication systems. In some implementations, the user can be identified via the user's mobile device. For example, the user can send identity information to the POS device, authentication systems and/or authorization systems to identity the user via one or more mobile applications. In some embodiments, the authentication systems can and/or POS provider can provide a secure mobile login via phone application or through a mobile web browser.

The merchant authorization system 180 compares the three received values to a set of pre-determined values that correspond to biometric data previously known about the person. The set of pre-determined values may be stored with the pre-determined password (as explained below) in the password database 185. In some embodiments, the merchant authorization system may determine that any two or more of the three values (e.g., the first value and the third value, or the first, second, and third values) are the same as the set of pre-determined values or are related to the set of pre-determined values by a mathematical function. For example, if first value is a hexadecimal value "0x2421," a set of pre-determined values may include a hexadecimal value "0x2421" or another hexadecimal value (e.g., "0x6C63") that may be mathematically related to the first value (e.g., multiplying first value by 3).

A benefit of having any two or more of the three values correspond to a set of pre-determined values is that in some cases, a person's received biometric data for one of the biometric categories (e.g., fingerprint) may not correspond to that person's previously stored biometric data. For instance, a person may have suffered injury to his or her fingers when the person provided fingerprint data to the POS device 130. In such cases, the received fingerprint data may be different from previously stored fingerprint data. Thus, the merchant authorization system 180 can authorize the transaction upon determining that any two or more of the first value, the second value, and the third value are related by a mathematical function to a set of pre-determined values or are same as the set of pre-determined values that correspond to voice data, fingerprint data, and facial data previously known about the person.

The merchant authorization system 180 also determines that the password is associated with or is same as another pre-determined value associated with the person. The merchant authorization system 180 compares the password received from the POS device 130 with a pre-determined password stored in the password database 185 to determine whether they are the same or whether they are related by some mathematical function.

Upon determining that any two or more of the three values received from the POS device 130 are related by a mathematical function to or are same as a set of pre-determined values, and upon determining that the password is associated with or is same as a pre-determined value stored in the password database 185, the merchant authorization system 180 sends a message to the POS device 130, where the message includes information that indicates to the POS device 130 that that the person 110 is authorized for the transaction. The merchant authorization system 180 may also authorize the transaction by sending another message to a payment merchant system (e.g., MasterCard system or VISA system).

Figure 3:
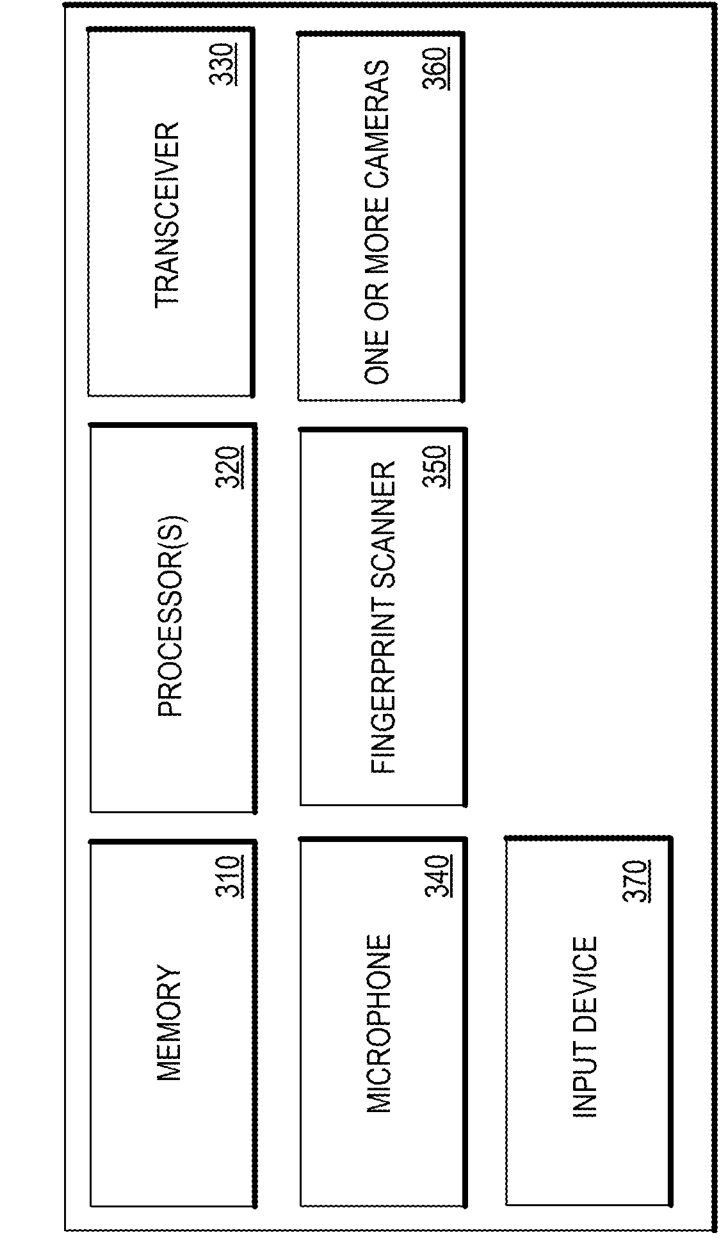
FIG. 3 shows a block diagram of a point-of-sale (POS) device.

FIG. 3 shows a block diagram of a POS device. The POS device 300 includes at least one processor 320 and a memory 310 having instructions stored thereupon. The instructions upon execution by the processor 320 configure the POS device 300 to perform the data collection operations associated with the various devices described in FIG. 3 and in this patent document. The POS device 300 may include a microphone 340 to receive voice data from a person initiating a transaction at the POS device 300. The POS device 300 may also include a fingerprint scanner 350 to receive fingerprint data from the same person, and one or more cameras 360 to receive facial data from the same person.

The POS device 300 may also include an input device 370 to receive a password. The input device 370 may be a keyboard so that a person may physically enter his or her password on the keyboard, or the input device 370 may be a wireless chip (e.g., Bluetooth chip or Near Field Communication (NFC) chip) so that the POS device 300 may wirelessly receive the password from a mobile device associated with the person. The microphone 340, fingerprint scanner 350, one or more cameras 360, or input device 370 may be physically connected to the POS device 300 or they may be wirelessly connected to the POS device 300 (e.g., devices 340, 350, 360, and 370 may be located at some distance from a location of the POS device 300).

The POS device 300 includes a transceiver 330 that includes transmitter to send the received voice data, fingerprint data, and facial data to a plurality of authentication systems via a network (e.g., the Internet). The transmitter also sends the password received from the input device 370 to an authorization system.

Figure 4:
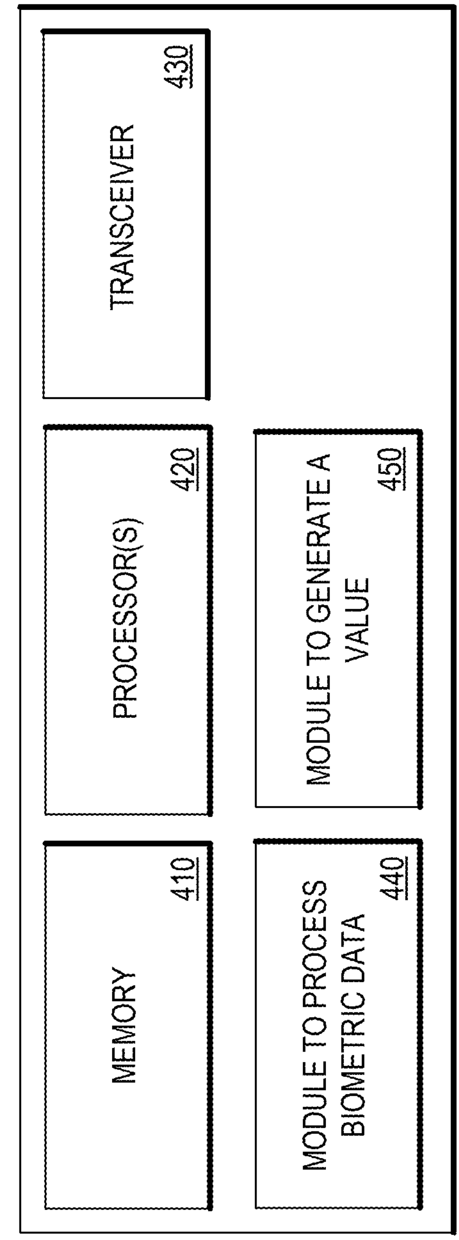
FIG. 4 shows a block diagram of an authentication system.

FIG. 4 shows a block diagram of an authentication system. The authentication system shown in FIG. 4 can be used as a voice authentication system 150, a fingerprint authentication system 150, or a face authentication system 170. In some embodiments, a single authentication system (i.e., a single server) can perform the operations associated with the three authentication systems 150, 160, 170. In some other embodiments, three authentication systems (e.g., three servers) can perform the operations associated with the three authentication systems 150, 160, 170. The authentication system 400 includes at least one processor 420 and a memory 410 having instructions stored thereupon. The instructions upon execution by the processor 420 configure the authentication system 400 to process the biometric data as described in FIG. 4 and in this patent document.

The authentication system 400 includes a transceiver 430 that includes a receiver to receive biometric data (e.g., voice, fingerprint, or facial data) from the POS device. As described in this patent document, the module to process biometric data 440 compares at least some features of the received biometric data to features of previously collected biometric data stored on a database. For example, if the authentication system 400 were operating as a voice authentication system 150, then the module to process biometric data 440 can determines that at least some of the features of the received voice data matches at least some of the features of the previously collected voice data.

If the received biometric data matches previously collected biometric data, then the module to generate a value 450 can combines at least some features of the received biometric data with a hash function to produce a hash value that is based on at least some of the received biometric data. In other embodiments, the module can simply send an authentication notification to the authorization system (e.g., Jane Doe has submitted voice biometric data and the voice biometric data matches (or is X % match) of the voice biometric data we have on store for Jane Doe).

Figure 5:
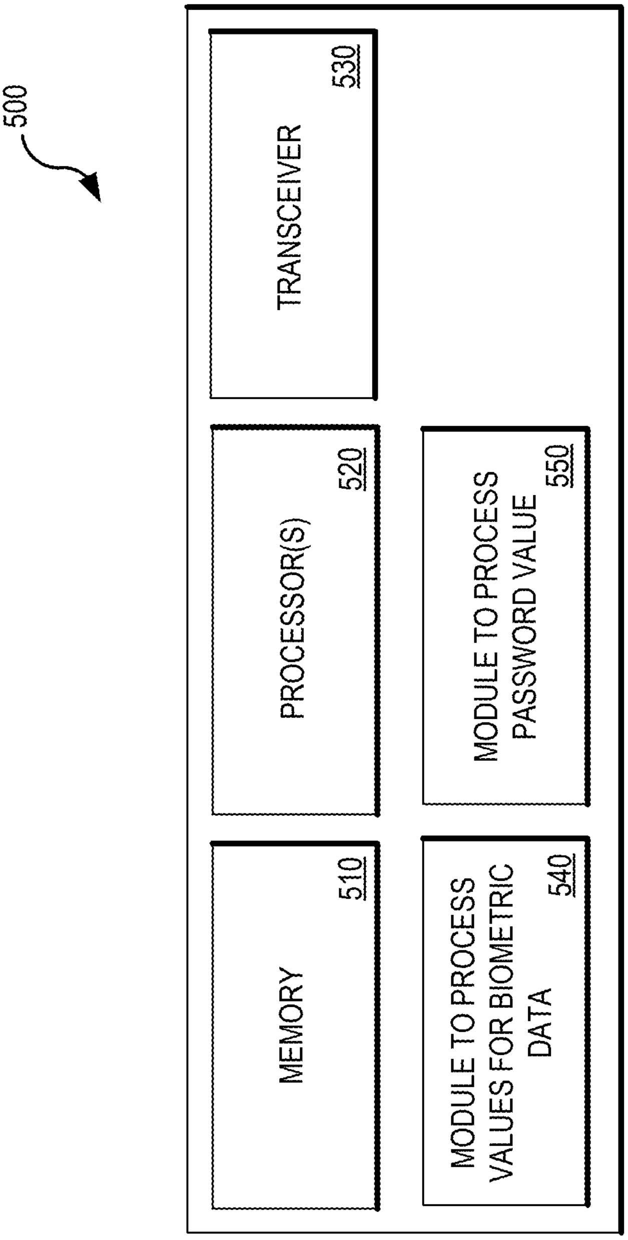
FIG. 5 shows a block diagram of an authorization system.

FIG. 5 shows a block diagram of a merchant authorization system. The merchant authorization system 500 includes at least one processor 520 and a memory 510 having instructions stored thereupon. The instructions upon execution by the processor 520 configure the authorization system 500 to process the values and password received from one or more authentication systems and POS device respectively.

The authorization system 500 includes a transceiver 530 that includes a receiver to receive a first set of values generated by one or more authentication systems. As mentioned in this patent document, the values may be obtained by combining at least some of the biometric data obtained from the POS device with a hash function. The module to process values for biometric data 540 compares the first set of values with a second set of pre-determined values that correspond to biometric data previously known about the person.

The module to process password value 550 compares the password received from a person via the POS device with a pre-determined password associated with the same person. If the module to process values for biometric data 540 determines that any two or more of the three values obtained from the one or more authentication system are related by a mathematical function to or are same as the second set of pre-determined values, and if the module to process password value 550 determines that the received password is associated with or is same as a pre-predetermined password value associated the person, then the transceiver 530 may send a message to the POS device indicating the person is authorized for the transaction.

In some embodiments, a different server with its own processor, memory, and transceiver can perform operations associated with each of the authentication system 150, 160, 170, and with the merchant authorization system 180. In some other embodiments, a single server can perform the operations associated with the three authentication systems 150, 160, 170, and the merchant authorization system 180. In embodiments involving a single server, the processors, memories, and transceiver (i.e., transmitter and receiver) associated with the authentication and authorization systems may be the same.

Figure 6:
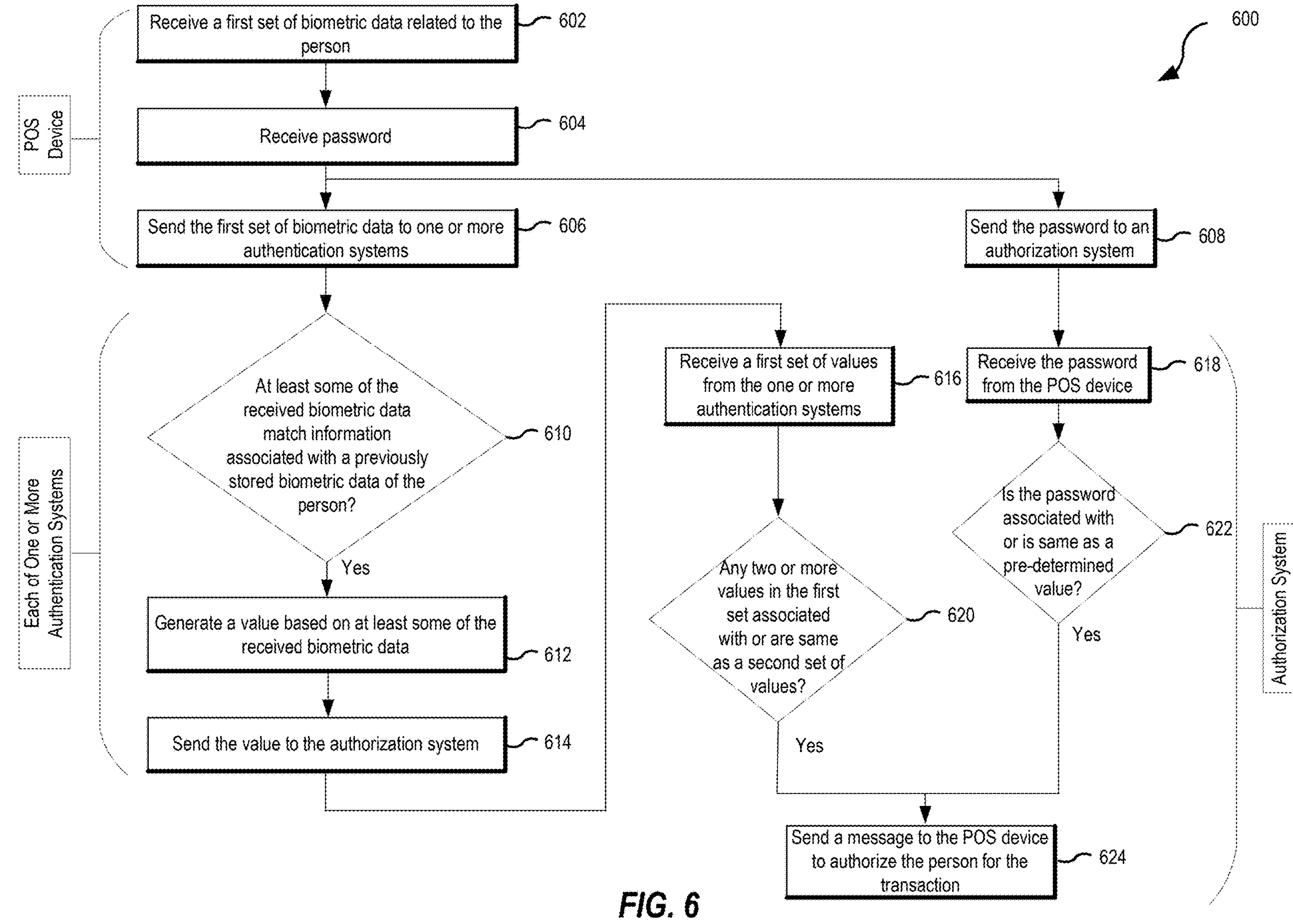
FIG. 6 shows a flowchart of operations performed by a biometric authentication system.

FIG. 6 shows a flowchart of operations performed by a biometric authentication system. FIG. 6 indicates the devices and/or systems that can perform the various operations. For instance, a POS device may perform operations 602 to 608, each of the one or more authentication systems perform operations 610 to 614, and an authorization system may perform operations 616 to 624.

A POS device is configured to perform a transaction with a person. At the first receiving operation 602, a POS device receives a first set of biometric data from a person. The first set of biometric data includes voice data provided by the person, fingerprint data provided by the person, or facial data provided by the person. Accordingly, the first set of biometric data is associated with biometric categories, such as voice, fingerprint, or facial features.

At the second receiving operation 604, the POS device receives a password from the person or from a mobile device associated with the person. In some embodiments, the second receiving operation 604 may be performed before first receiving operation 604, so that the receiving of the password triggers the receiving of the biometric data at the first receiving operation 604. In some embodiments, the password is first sent to the person's mobile device by the authorization system, and then the password is entered into the POS system by the person or is wirelessly sent to the POS system by the mobile device. In some embodiments, the password may be periodically changed by the authorization system after a pre-determined period of time.

At the sending operation 606, the POS device sends the first set of biometric data to one or more authentication systems. At the sending operation 608, the POS device sends the password to an authorization system.

Each of the one or more authentication systems can receive and process biometric data associated with one biometric category (e.g., one of voice, fingerprint, and facial features). In one example, a first authentication system can receive and process voice data received from the POS device, a second authentication system can receive and process fingerprint data received from the POS device, and the third authentication system can receive and process facial data received from the POS device. In another example, one authentication system can receive and process the voice data, fingerprint data, and facial data received from the POS device.

At the determining operation 610, each authentication system determines if at least some of the received biometric data (e.g., voice, fingerprint, facial data) matches information associated with a previously stored biometric data of the person. If at least some of the received biometric data matches information associated with a previously stored biometric data, then each authentication system generates a value (e.g., an authentication hash value) at the generating operation 612. The value is based on at least some of the received biometric data and a hash function. In some embodiments, the hash function used by each biometric category may be different. For example, a voice authentication system may use a hash function different from the hash function used by the fingerprint authentication system. In some embodiments, the hash function may be periodically changed after a pre-determined length of time.

At the sending operation 614, each authentication system sends the generated value to the authorization system. In some embodiments, the one or more authentication system may send a first set of values corresponding to the voice data, the fingerprint data, and the facial data obtained from the person.

An authorization system may authorize the person for the transaction based on the first set of biometric data and the received password. At the receiving operation 616, the authorization system receives receive a first set of values from the one or more authentication systems. The first set of values correspond to and describe the first set of biometric data received from the POS device. The first set of values may also be associated with the person's form of payment (e.g., credit card or debit card number).

At the determining operation 620, the authorization system determines whether any two or more values in the first set are related by a mathematical function or are same as a second set of values that correspond to a second set of biometric data previously known about the person. The second set of biometric data (i.e., previously known biometric data) and the first biometric data (i.e., received biometric data from the person) include biometric data associated with the same biometric categories. For instance, if the first set of biometric data includes voice and facial features received from a person by the POS device, the second set of biometric data includes at least the previously known voice and facial features of the same person.

At the receiving operation 618, the authorization system receives the password from the POS device. The password may be associated with the person's credit card or debit card number. At the determining operation 622, the authorization system determines whether the password received from the POS device is associated with (e.g., via a mathematical relationship) or is same as a pre-determined value (e.g., a previously known password) associated with the person.

If any two or more values in the first set are related by a mathematical function or are same as a second set of values (determined at operation 620), and if the received password is associated with or is same as a pre-determined value (determined at operation 622), then the authorization system performs the sending operation 624. At the sending operation 624, the authorization system sends a message to the POS device, where the message indicates that the person is authorized for the transaction.

Figure 7:
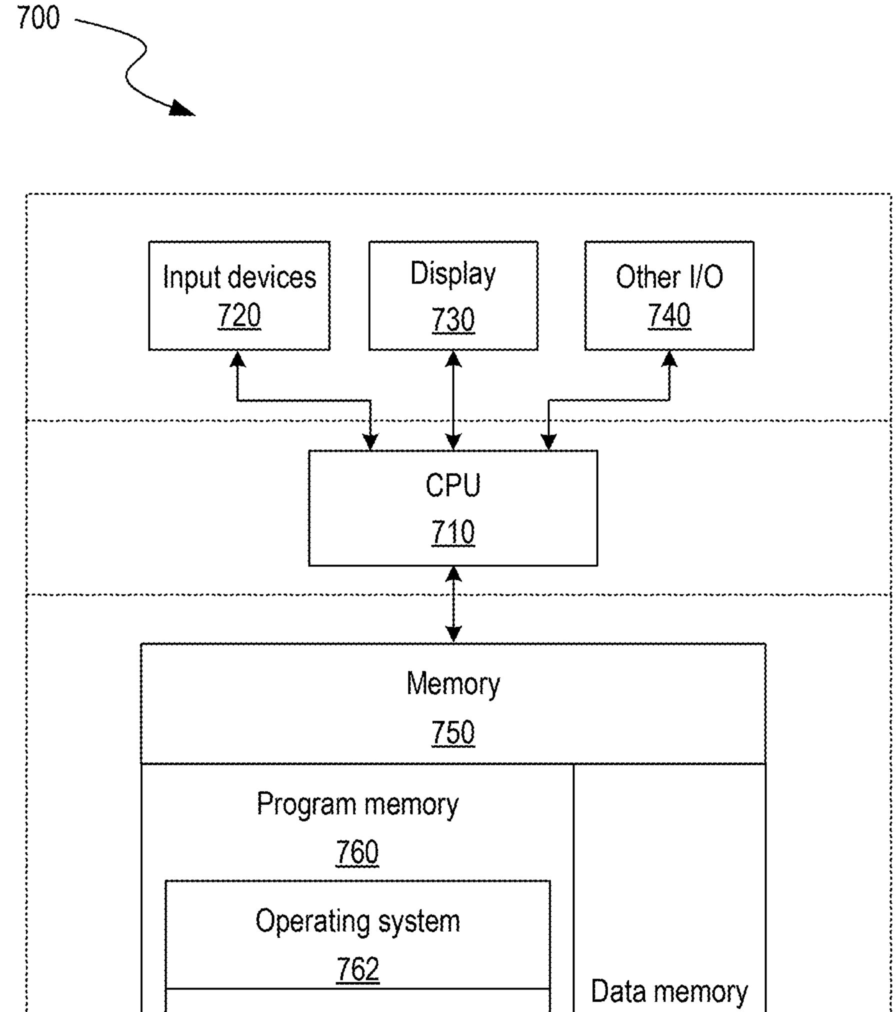
FIG. 7 is a block diagram illustrating an overview of devices on which some implementations of the disclosed technology can operate.

FIG. 7 is a block diagram illustrating an overview of devices on which some implementations of the disclosed technology can operate. The devices can comprise hardware components of a device 700 that manages the operations or features associated with the POS device, one or more authentication systems, or a merchant authorization system. Device 700 can include one or more input devices 720 that provide input to the CPU 710, notifying it of actions, such as received password and/or biometric data to be analyzed. The actions are typically mediated by a hardware controller that interprets the signals received from the input device and communicates the information to the CPU 710 using a communication protocol. Input devices 720 include, for example, a mouse, a keyboard, a touchscreen, an infrared sensor, a touchpad, a wearable input device, a camera- or image-based input device, a microphone, a mobile device (e.g., a mobile phone or a tablet), or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a user. In some implementations, display 730 includes the input device as part of the display, such as when the input device is a touchscreen. In some implementations, the display is separate from the input device. Examples of display devices are: an LCD display screen; an LED display screen; a projected, holographic, or augmented reality display (such as a heads-up display device or a head-mounted device); and so on. Other I/O devices 740 can also be coupled to the processor, such as a network card, video card, audio card, USB, FireWire or other external device, camera, printer, speakers, CD-ROM drive, DVD drive, disk drive, or Blu-Ray device.

In some implementations, the device 700 also includes a communication device capable of communicating wirelessly or wire-based with a network node, such as a router. The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762, POS device, one or more authentication systems, or merchant authorization system functions 764. Memory 750 can also include data memory 770 that can include the previously known biometric information of various persons, etc., which can be provided to the program memory 760 or any element of the device 700. The CPU 710 can perform operations associated with the POS device, one or more authentication systems, or merchant authorization system as described in this patent document.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

The invention claimed is:

1. A method of performing biometric authentication to authorize a person for a transaction, the method comprising:

receiving at least one first value that corresponds to a first set of biometric data, wherein the first set of biometric data is obtained from the person by one or more first input devices at a point of sale (POS) device;

receiving at least one second value that corresponds to a second set of biometric data, wherein the second set of biometric data is obtained from the person by one or more second input devices at the POS device;

determining that the at least one first value is related by a mathematical function to at least one third value that corresponds to a third set of biometric data previously known about the person;

determining that the at least one second value is related by an other mathematical function to at least one fourth value that corresponds to a fourth set of biometric data previously known about the person;

obtaining payment data for the person using the at least one first value and the at least one second value, at least one first portion of the payment data being associated with the at least one first value and at least one second portion of the payment data being associated with the at least one second value; and in response to A) determining the at least one first value is related to the at least one third value and B) determining the at least one second value is related to the at least one fourth value, sending a message to the POS device, wherein the message indicates that the person is authorized for the transaction.

2. The method of claim 1, further comprising:

receiving a code, wherein the sending the message to the POS device is further in response to verification of the code.

3. The method of claim 2, further comprising:

sending the code to a mobile device associated with the person prior to receiving the code, wherein the code is periodically changed after a pre-determined length of time.

4. The method of claim 2, wherein the code is sent by a mobile device to the POS device using Bluetooth or Near-Field Communication (NFC) technology.

5. The method of claim 2, wherein the at least one first value and the code are associated with a credit card or a debit card number associated with the person.

6. The method of claim 1, wherein the at least one first value is an authentication hash value, and wherein the at least one first value is generated by using at least some of the first set of biometric data and a hash function.

7. The method of claim 1, wherein the first set of biometric data is associated with a first biometric category, of multiple biometric categories, and the second set of biometric data is associated with a second biometric category of the multiple biometric categories.

8. The method of claim 1, wherein the first set of biometric data and the second set of biometric data include two or more of voice data of the person, fingerprint data of the person, or facial data of the person.

9. The method of claim 1, wherein, in response to the POS device receiving message, the payment data is used to perform the transaction.

10. The method of claim 1, wherein the transaction is associated with one or more type combinations, each type combination specifying one or more biometric data types that, in combination, are sufficient to allow the transaction; and wherein the determining the at least one first value is related to the at least one third value includes determining that the first set of biometric data includes one or more types of biometric data matching at least one of the one or more type combinations.

11. The method of claim 10, wherein the one or more type combinations are assigned to the transaction based on one or more of:

a party to the transaction being a particular store or a particular person, an amount for the transaction being above a threshold, the transaction being attempted during a particular time period, the transaction being attempted within a particular geographic area, or any combination thereof.

12. The method of claim 1, wherein the first set of biometric data includes multiple types of biometric data; and wherein the determining the at least one first value is related to the at least one third value includes determining that values, based on first set of biometric data and corresponding to each type of biometric data, corresponds to biometric data previously known about the person.

13. A non-transitory computer-readable storage medium storing instructions, for performing biometric authentication to authorize a person for a transaction, the instructions, when executed by a computing system, cause the computing system to:

receive at least one first value that corresponds to a first set of biometric data, wherein the first set of biometric data is obtained from the person by one or more first input devices at a point of sale (POS) device;

receive at least one second value that corresponds to a second set of biometric data, wherein the second set of biometric data is obtained from the person by one or more second input devices at the POS device;

determine that the at least one first value is related by a mathematical function to at least one third value that corresponds to a third set of biometric data previously known about the person;

determine that the at least one second value is related by an other mathematical function to at least one fourth value that corresponds to a fourth set of biometric data previously known about the person;

obtain payment data for the person using the at least one first value and the at least one second value, at least one first portion of the payment data being associated with the at least one first value and at least one second portion of the payment data being associated with the at least one second value; and in response to A) determining the at least one first value is related to the at least one third value and B) determining the at least one second value is related to the at least one fourth value, send a message to the POS device, wherein the message indicates that the person is authorized for the transaction.

14. The non-transitory computer-readable storage medium of claim 13, wherein the instructions, when executed, further cause the computing system to:

receive a code, wherein the sending the message to the POS device is further in response to verification of the code.

15. The non-transitory computer-readable storage medium of claim 14, wherein the instructions, when executed, further cause the computing system to:

send the code to a mobile device associated with the person prior to receiving the code, wherein the code is periodically changed after a pre-determined length of time.

16. The non-transitory computer-readable storage medium of claim 13, wherein the at least one first value is an authentication hash value, and wherein the at least one first value is generated by using at least some of the first set of biometric data and a hash function.

17. The non-transitory computer-readable storage medium of claim 13, wherein the first set of biometric data and the second set of biometric data include two or more of voice data of the person, fingerprint data of the person, or facial data of the person.

18. A computing system for performing biometric authentication to authorize a person for a transaction, the computing system comprising:

one or more processors; and one or more memories storing instructions that, when executed by the one or more processors, cause the computing system to:

receive at least one first value that corresponds to a first set of biometric data, wherein the first set of biometric data is obtained from the person by one or more first input devices at a point of sale (POS) device;

receive at least one second value that corresponds to a second set of biometric data, wherein the second set of biometric data is obtained from the person by one or more second input devices at the POS device;

determine that the at least one first value is related by a mathematical function to at least one third value that corresponds to a third set of biometric data previously known about the person;

determine that the at least one second value is related by an other mathematical function to at least one fourth value that corresponds to a fourth set of biometric data previously known about the person;

obtain payment data for the person using the at least one first value and the at least one second value, at least one first portion of the payment data being associated with the at least one first value and at least one second portion of the payment data being associated with the at least one second value; and in response to A) determining the at least one first value is related to the at least one third value and B) determining the at least one second value is related to the at least one fourth value, send a message to the POS device, wherein the message indicates that the person is authorized for the transaction.

19. The computing system of claim 18, wherein, in response to the POS device receiving message, the payment data is used to perform the transaction.

20. The computing system of claim 18, wherein the transaction is associated with one or more type combinations, each type combination specifying one or more biometric data types that, in combination, are sufficient to allow the transaction; and wherein the determining the at least one first value is related to the at least one third value includes determining that the first set of biometric data includes one or more types of biometric data matching at least one of the one or more type combinations.

* * * * *